US008424005B2

(12) United States Patent
Strom et al.

(10) Patent No.: US 8,424,005 B2
(45) Date of Patent: Apr. 16, 2013

(54) SYSTEM AND METHOD FOR TIME-AWARE RUN-TIME TO GUARANTEE TIME

(75) Inventors: Robert E. Strom, Ridgefield, CT (US); Chitra Dorai, Chappaqua, NY (US); Huining Feng, Albany, CA (US); Wei Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/509,962

(22) Filed: Jul. 27, 2009

(65) Prior Publication Data

US 2011/0023050 A1 Jan. 27, 2011

(51) Int. Cl.
G06F 9/46 (2006.01)
G06F 13/00 (2006.01)

(52) U.S. Cl.
USPC .......................................... 718/102; 719/318

(58) Field of Classification Search ........................ None
See application file for complete search history.

(56) References Cited

U.S. PATENT DOCUMENTS

| 4,665,520 | A | 5/1987 | Strom et al. |
|---|---|---|---|
| 6,078,930 | A | 6/2000 | Lee et al. |
| 2003/0005102 | A1 | 1/2003 | Russell |
| 2007/0050582 | A1 | 3/2007 | Mangione-Smith |
| 2010/0118778 | A1* | 5/2010 | Ranke et al. ................. 370/328 |

OTHER PUBLICATIONS

Armbruster, "A Real-Time Java Virtual Machine with Applications in Avionics", Dec. 2007, ACM, vol. 7, No. 1.*
Russell, D.L.,"State restoration in systems of communicating processes", IEEE Transactions on Software Engineering, Mar. 1980.
Jefferson, D., "Virtual time", ACM Transactions of Programming Language and Systems, Jul. 1985.
Strom, et al., "Optimistic Recovery in Distributed Systems", ACM Transactions on Computer Systems, Aug. 1985.
Bhola, et al.,"Exactly-once delivery in a content-based published-subscribe system", Proceedings of the International Conference on Dependable Systems and Networks (DSN'2002).
Bacon, et al.,"Guava: a dialect of Java without data races", Proceedings of the 15th ACM SIGPLAN conference on Object-oriented programming, systems, languages, and applications, 2000.
International Search Report, filed in co-pending International application No. PCT/US08/04866, mailed Jul. 18, 2008.

* cited by examiner

*Primary Examiner* — S. Sough
*Assistant Examiner* — Phuong Hoang
(74) *Attorney, Agent, or Firm* — Scully, Scott, Murphy & Presser, P.C.; Louis J. Percello, Esq.

(57) ABSTRACT

A method and system for achieving time-awareness in the highly available, fault-tolerant execution of components in a distributed computing system, without requiring the writer of these components to explicitly write code (such as entity beans or database transactions) to make component state persistent. It is achieved by converting the intrinsically non-deterministic behavior of the distributed system to a deterministic behavior, thus enabling state recovery to be achieved by advantageously efficient checkpoint-replay techniques. The system is deterministic by repeating the execution of the receiving component by processing the messages in the same order as their associated timestamps and time-aware by allowing adjustment of message execution based on time.

25 Claims, 11 Drawing Sheets

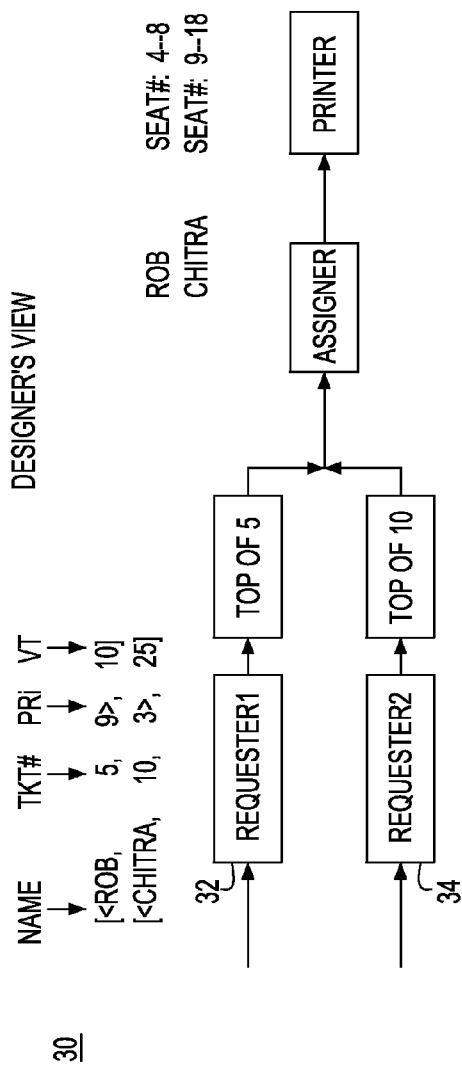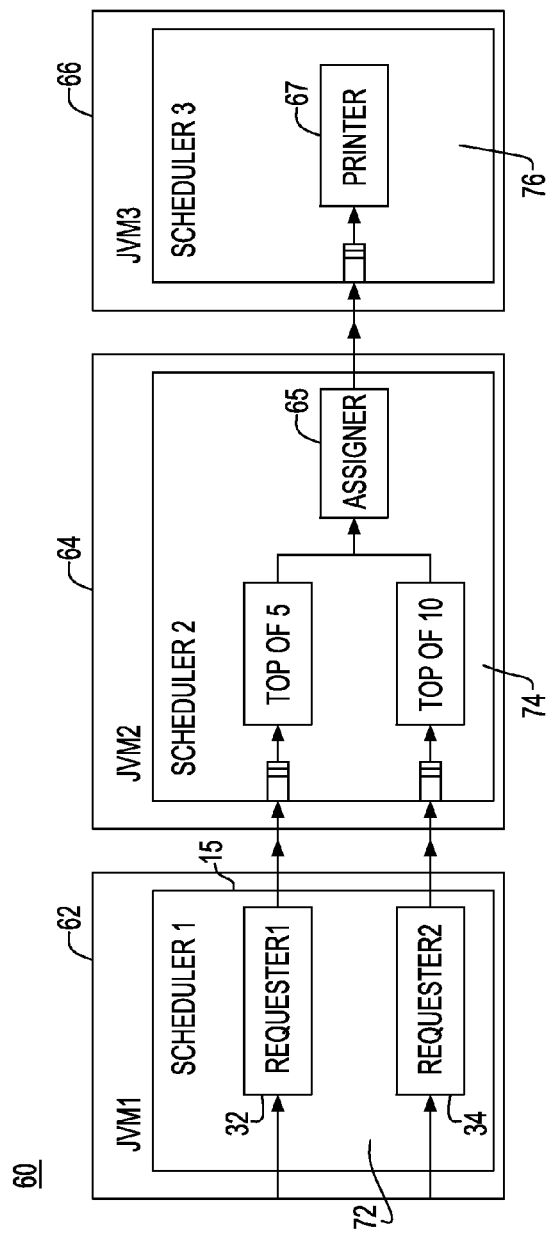

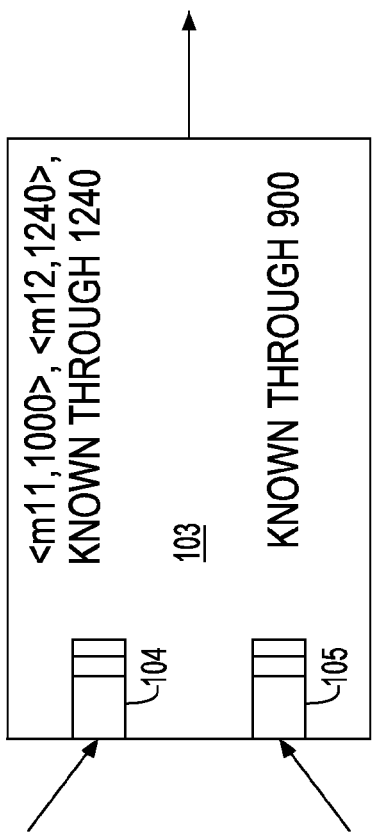

SYSTEM AND METHOD FOR TIME-AWARE RUN-TIME TO GUARANTEE TIME

CROSS-REFERENCE TO RELATED APPLICATION

This application is related to commonly owned U.S. Pat. No. 7,937,618 incorporated herein by reference.

FIELD OF THE INVENTION

The present invention relates generally to application development tools, methods and systems for developing and executing distributed systems, and more particularly, an improved environment for developing and executing distributed, transparently fault-tolerant, and highly available systems for executing component oriented applications.

BACKGROUND OF THE INVENTION

SCA Service Component Architecture provides an open, technology-neutral model for implementing IT services that define a business function. The SCA also provides a model for the assembly of business solutions from collections of individual services, with control over aspects of the solution such as access methods and security. With a SCA, customers are able to more easily create new, and transform existing, IT assets into reusable services that may be rapidly adapted to changing business requirements. The specifications that enable the building of SCA (middleware) components take advantage of a Service-Oriented Architecture (SOA), which structures IT assets as a series of reusable services that perform business functions. The Service Oriented Architecture combines the ability to invoke remote objects and functions (called "services") with tools for dynamic service discovery, placing an emphasis on interoperability. Currently, a goal of the industry is to provide application developers with simpler and more powerful ways of constructing applications based on SOA.

Moreover, in the development of distributed systems implementing SCA components, it is a goal to provide for transparent and fault-tolerant availability of 'non-volatile' data that may either represent persistent 'settings' (to be stored on mass-media throughout the distributed system) or 'state' preserved in a fault-tolerant manner. Presently, the development of distributed fault-tolerant and highly available systems is ad-hoc, error-prone, and time-consuming. Current solutions are analogous to an example currency exchange system where the fluctuation of currency price and exchange operations may be out of order or non-atomic. Execution is usually non-deterministic due to the network or threading: Existing mechanisms for persistence (entity beans, JDBC, etc) are heavyweight and they necessitate extra knowledge and extra code.

For example, a current solution implements entity beans, e.g., "Enterprise Java Bean" (EJB) that includes the server-side component architecture for the J2EE platform. EJBs purportedly support rapid and simplified development of distributed, transactional, secure and portable Java applications. EJBs support a container architecture that allows concurrent consumption of messages and provide support for distributed transactions, so that database updates, message processing, and connections to enterprise systems using the J2EE architecture can participate in the same transaction context.

It would be highly desirable to eliminate the need to require programmers to learn specialized methodologies and structures such as transactions, JDBC, or entity beans that separate out component state into separate objects and to persist that state, and, instead, to automatically provide persistence and fault-tolerance for ordinary code (known as "transparent fault-tolerance"). Many applications perform computations that depend only on input data and do not explicitly account for the time needed to execute the necessary code. Such applications are known as being "non-time-aware". Other applications, knows as time-aware applications, require different decisions be made based upon the execution speed of the running system. For example, taking a default action when no event has arrived by a certain time, or performing a faster computation, at the expense of less precision, when a slower and more precise calculation may deliver a result too late. It would be desirable for an execution environment to support non-time-aware applications transparently as well as providing interfaces for time-aware computations.

There do exist techniques for transparent fault-tolerance in distributed systems, including a technique described in U.S. Pat. No. 4,665,520 commonly owned by the assignee of the present invention. The performance of such techniques is limited by the non-determinism of the behavior of communicating components in distributed systems, as each communication from one distributed component to another needs to be logged.

Moreover, it would be highly desirable to provide an execution server that transparently supports deterministic execution, fault tolerance, and high availability, to avoid the performance problems of recovering non-deterministic distributed systems. It is known that there is a certain overhead in implementing deterministic execution, as in the foundational invention. It would be desirable to introduce improvements to minimize this overhead. Furthermore, it would be desirable for such systems to be efficient in the presence of a certain amount of inevitable non-determinism that can arise in time-aware applications.

Furthermore, it would be highly desirable to provide a simple component-based model for programmers and, particularly, to provide a system and method for making middleware functions more accessible to the application developer.

SUMMARY OF THE INVENTION

Thus, it is a broad object of the invention to remedy the shortcomings of the prior art as described here above.

It is another object of the invention to provide an execution environment that transparently supports deterministic execution, fault tolerance, high availability and time-awareness for component-oriented applications.

The accomplishment of these and other related objects is achieved by a computing system and methodology. The deterministic computing system comprising:

at least one computing machine executing a plurality of components, where a component executes instructions to control said computing machine to perform a task and communicate data messages to other components and where the component is a sending component when sending a data message and a promised silence message and is a receiving component when receiving the data message and promised silence message;

means for recording virtual time by the component to start computation of the data message by the component;

means for computing a delta-VT for the data message, where the delta-VT is a numeric value calculated to include an approximate execution time for the data message and an approximate communications delay for sending the data message;

means for computing a data timestamp associated with the data message when sent by the sending component to the receiving component, where the data timestamp is calculated by increasing the virtual time with the delta-VT;

means for computing a promised silence by the sending component, where the promised silence indicates a range of virtual time values that the sending component will avoid sending data messages;

means for communicating the promised silence from the sending component to other components;

means for executing the data message by using the data timestamps to generate a unique arrival order of data messages;

means for implementing a provisional message service, in which a sending component sends to a receiving component a fallback data message and a deadline, such that if said provisional message is not superseded before the deadline, the fallback data message will be delivered to the receiver;

means for exploiting the promised silence by the receiving component to determine when to process data messages in said unique arrival order;

means for tracking state of a component during program execution; and means for storing said state to a local storage device or backup machine.

According to a further embodiment of the invention, there is provided a method for deterministic execution of components in a computing system providing an execution environment adapted for enabling message communication amongst and between said components, each said component implementing logic to perform a task and each component is a sending component when sending a data message and is a receiving component when receiving the data message, said method comprising:

recording virtual time by the component to start computation of the data message by the component;

computing a delta-VT for the data message, where the delta-VT is a numeric value calculated to include an approximate execution time for the data message and an approximate communications delay for sending the data message;

computing a data timestamp associated with the data message when sent by the sending component to the receiving component, where the data timestamp is calculated by increasing the virtual time with the delta-VT;

computing a promised silence by the sending component, where the promised silence indicates a range of virtual time values that the sending component will avoid sending data messages;

communicating the promised silence from the sending component to other components;

executing the data message by using the data timestamps to generate a unique arrival order of data messages;

implementing a provisional message service, in which a sending component sends to a receiving component a fallback data message and a deadline, such that if said provisional message is not superseded before the deadline, the fallback data message will be delivered to the receiver;

exploiting the promised silence by the receiving component to determine when to process data messages in said unique arrival order;

tracking state of a component during program execution; and storing said state to a local storage device or backup machine.

Yet according to a further embodiment of the invention, there is a program storage device readable by a machine, tangibly embodying a program of instructions executable by the machine to perform a method for deterministic execution of components in a computing system providing an execution environment adapted for enabling message communication amongst and between said components, each said component implementing logic to perform a task and each component is a sending component when sending a data message and is a receiving component when receiving the data message, said method steps comprising:

recording virtual time by the component to start computation of the data message by the component;

computing a delta-VT for the data message, where the delta-VT is a numeric value calculated to include an approximate execution time for the data message and an approximate communications delay for sending the data message;

computing a data timestamp associated with the data message when sent by the sending component to the receiving component, where the data timestamp is calculated by increasing the virtual time with the delta-VT;

computing a promised silence by the sending component, where the promised silence indicates a range of virtual time values that the sending component will avoid sending data messages;

communicating the promised silence from the sending component to other components;

executing the data message by using the data timestamps to generate a unique arrival order of data messages;

implementing a provisional message service, in which a sending component sends to a receiving component a fallback data message and a deadline, such that if said provisional message is not superseded before the deadline, the fallback data message will be delivered to the receiver;

exploiting the promised silence by the receiving component to determine when to process data messages in said unique arrival order;

tracking state of a component during program execution; and storing said state to a local storage device or backup machine.

BRIEF DESCRIPTION OF THE DRAWINGS

The objects, features and advantages of the present invention will become apparent to one skilled in the art, in view of the following detailed description taken in combination with the attached drawings, in which:

FIGS. 3A-3C depict embodiments of the present invention, where the placement of components from an example user-design (FIGS. 3A, 3B) and virtual time estimation (FIG. 3C) are illustrated;

FIG. 7 illustrates an exemplary condition where the fan-in component may not dequeue;

FIG. 8 illustrates a second exemplary condition where the fan-in component may not dequeue;

DETAILED DESCRIPTION OF THE PREFERRED EMBODIMENTS

As mentioned above, the proposed invention aims to address the problems in the art, namely the continued need to provide programmers with specialized methodologies and structures such as transactions, JDBC, or entity beans that separate out component state into separate objects in order to persist that state, and the need to log messages between components in non-deterministic implementations. This is addressed by providing a deterministic and highly available execution server that automatically provides persistence and fault-tolerance for executing component oriented applications.

Figure 1:
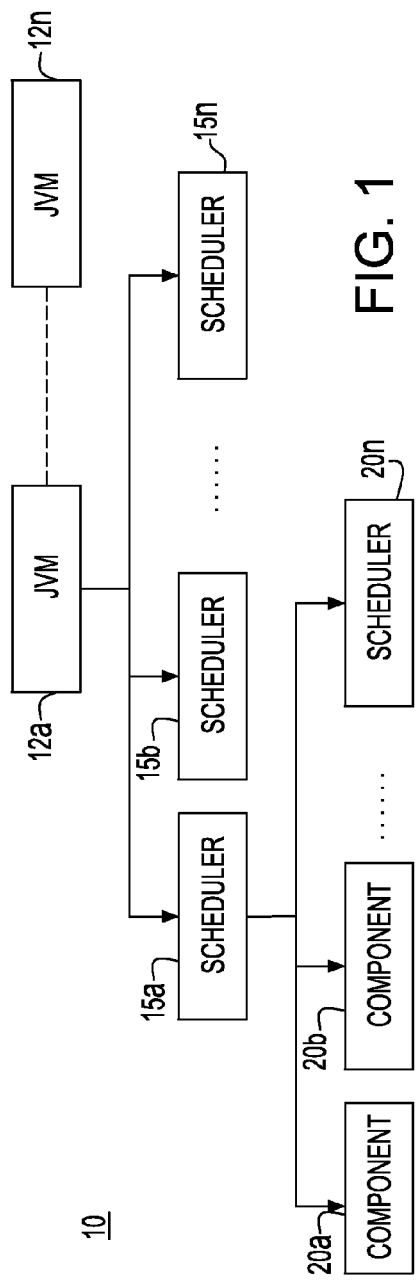
FIG. 1 depicts an execution server architecture 10 in which a middleware application is run for executing components and component oriented applications in accordance with the present invention.
Figure 2:
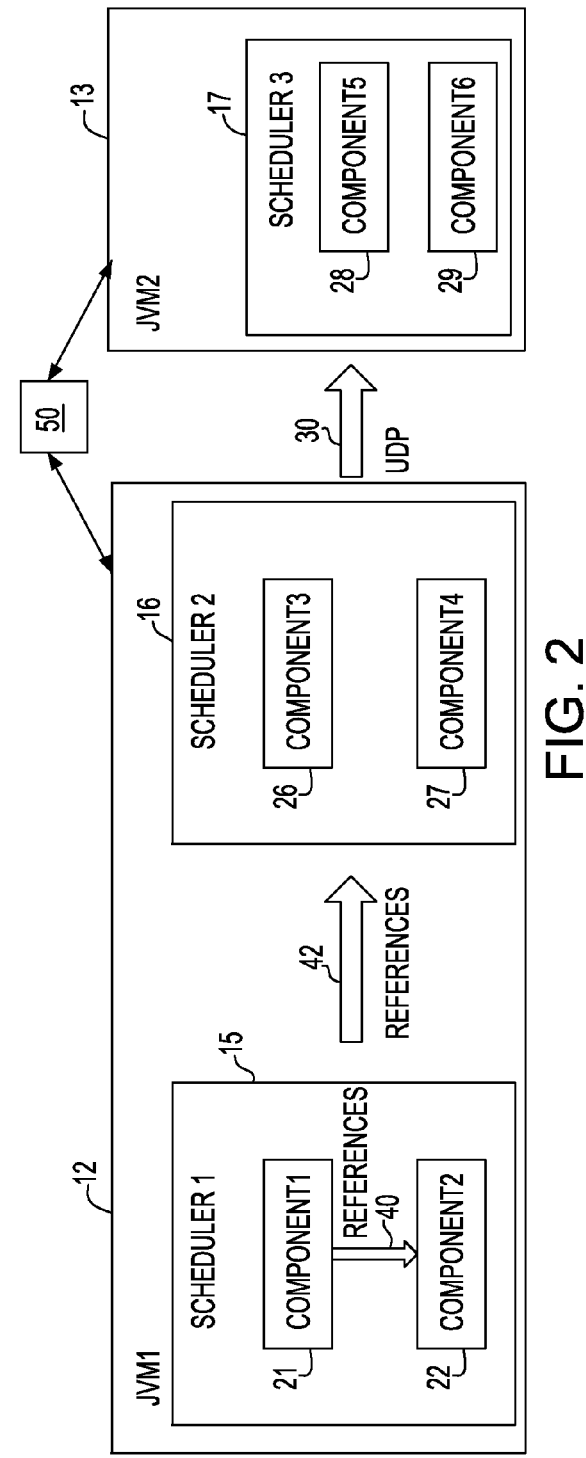
FIG. 2 depicts embodiment of messaging and communication between components in a single execution engine—in this example a Java Virtual Machine (JVM), and, between and among multiple execution engines according to the execution server architecture of the present invention.

FIG. 1 depicts an execution server architecture 10 in which the present middleware application is run for executing components and component oriented applications, represented generally as components 20a, . . . , 20n. As shown in FIG. 1, each server includes one or more Java Virtual Machines, represented generally as JVM's 12a, . . . , 12n, such as shown in FIG. 1. It is understood that there may be multiple servers, and within each server, there may be multiple instances of Java Virtual Machine (JVMs), running, for example, as different processes within a single machine. It is understood that the use of Java and JVMs is purely exemplary; instead of a JVM one may use the execution environment of other languages in which application components are written. Within each JVM a scheduler layer is provided, containing at least one scheduler, represented generally as schedulers 15a, . . . 15n, as a layer between JVMs and components in the hierarchy that are transparent to developers. A scheduler 15a, 15b . . . 15n is a grouping of one or more tightly related components in a JVM, together with logic deciding when to execute these components. There may be multiple schedulers in the JVM, each managing the execution of its own respective component(s). For example, as shown in FIG. 2, JVM 12 implements a scheduler 15 for managing execution of components 21 and 22 and implements a scheduler 16 for executing components 26, 27. A second JVM 13 includes scheduler 17 for managing components 28 and 29. In particular, as shown in FIG. 2, the scheduler layer between JVMs and components in the hierarchy manages the execution of components in a JVM. It is understood that, within a JVM, the communication between components and that between schedulers are efficiently implemented by reference passing. There may be multiple schedulers in the JVM, each managing the execution of its own components. When a component has an input message pending, the scheduler will choose an appropriate time to assign an available thread to execute it. This decision is made based on a number of factors, such as system load, user-required throughput, memory consumption caused by queuing, etc. Concurrency is obtained when the scheduler decides to execute multiple components at the same time.

Components

As known in the art, a component may be service-oriented or event-oriented and may be any collection of "objects" that are consistent with an SCA-like component model. Typically, the Java Language or C++ Language or like object-oriented language, or other languages such as Python or Perl, are used for implementing SCA service components, and the data sent between components. That is, interaction between components occurs only by passing data messages across ports, or by a service call from a service consumer to a service provider, in which data values can be passed and returned. Receivers of sent messages or service calls appear as objects with synchronized methods. One thread of control exists within a component at any one time. No object is ever shared between components. Objects are either: (a) the component object itself, a "monitor" with synchronized methods, (b) "value" objects, that can be passed from component to component, but never shared, or (c) "implementation" objects, that can be shared, but only within either the component object itself or within the same value object. This discipline, which assures, among other things, that no data is concurrently owned by more than one executing component, is formalized and described in a reference authored by David Bacon, Robert Strom, Ashis Tarafdar entitled "Guava: a dialect of Java without data races," Proceedings of the 15th ACM SIGPLAN conference on Object-oriented programming, systems, languages, and applications, 2000, the contents and disclosure of which is incorporated by reference as if fully set forth herein. According to the Guava techniques, it is possible to statically check that a particular component obeys this discipline. The Guava dialect of Java, running on a JVM is just one example of the kind of component implementation language suitable for use in the environment of this invention.

To make components "wireable", the input methods for service calls serviced by a component, or the message queues for asynchronous messages received by a component, are made externally available as input "ports". Sites making calls or sending messages to other components are made externally available as output "ports" as shown in FIG. 2. It is assumed that a separate deployment-time decision is made that determines (a) how output ports are "wired" to input ports, and (b) where to place components. As a result of these decisions, some port connections may be local, and others remote. It is understood that messages and service calls may be communicated more efficiently (e.g., "by reference") when the port connection connects components within the same JVM (e.g. connection 40 in FIG. 2), and less efficiently (e.g., by copying, or by sending network messages), when these components are in different JVMs (e.g. connection 42 in FIG. 2).

As mentioned, the execution server of the invention is designed to support distributed execution across machines. Multiple instances of Java Virtual Machine (JVMs) may run on those machines or run as different processes within a single machine, depending on the deployment. As shown in FIG. 2, an example protocol for message communication between JVMs is User Datagram Protocol (UDP) 30. Thus, in the example embodiment depicted in FIG. 2, the JVM 12 communicates via UDP messaging protocol with the JVM 13. As known, the use of UDP does not provide guaranteed delivery but features better performance over Transmission Control Protocol (TCP). Instead, loss-free and order-preserving messaging is built in the middleware component of the invention as will be described in greater detail herein below.

Development

The Execution Server of the invention is distinguished from other approaches because: (1) the development environment is radically simplified: Components can be written in plain Java, and can be wired, as in SCA component models, to build a distributed flow network; (2) Components store state in plain Java primitive variables and collection classes; (3) Programmers need not use specialized methodologies and structures, such as transactions, JDBC, or entity beans to separate out component state into separate objects and to persist that state. Instead, persistence and fault-tolerance are provided automatically by the execution server(s) of the invention, despite machine failures, and faulty networks that may drop, reorder, or duplicate messages.

Deterministic Execution

In accordance with the methodology of the invention, the technology for fault-tolerance is based upon assuring deterministic, replayable execution of the system. This is an improvement over other approaches based upon transactions, or based on replication, or based on persistently logging all inter-component messages. Deterministic execution means that if the system is given the same state and the same input messages, it will generate the same output messages. Determinism implies that upon a failure of a component, its state can be restored by recovering a recent checkpoint, and replaying the events occurring since that checkpoint. Because of determinism, the state after the replay is guaranteed to be the same as the lost state. This means that state does not need to be saved persistently each time it is updated, but only intermittently.

The achievement of deterministic execution is based upon generalizing techniques from discrete event simulation and applying them to the run-time environment of the execution server. As in event simulators, each message communicated between components is tagged with a virtual time (VT). Unlike event simulators, the virtual time is chosen to be a deterministic estimate of the real time at which the message will arrive at the receiving component. The execution server of the invention guarantees that the system will behave as if the messages had arrived in virtual time order. The better the correspondence between virtual time and real time, the better the system will perform; however, deterministic execution is guaranteed and independent of this correspondence. In a variant of this approach, the virtual time is a real-time deadline, and the system will adjust the scheduling to guarantee to meet these real-time deadlines. This is also unlike the case of event simulators, wherein simulated virtual time may have no obvious correlation with real time.

Deterministic execution is achieved by augmenting all communications with timestamps containing virtual times (VTs). At the system boundary, external events are received, which did not contain timestamps when they were generated. According to the invention, the system, without manual intervention, automatically assigns VTs to those events. The VTs conform to causal order, i.e., if an output is caused by an input, it must not occur at an earlier virtual time, and is an approximation to the real time. A log records all the assigned VTs, because their generation is non-deterministic, and the log will be essential when replay is required later. Once events are augmented with VTs on the boundary, they travel via the connections between components, and are processed in a deterministic order. No future logging is necessary. This is in contrast to the approach used by Optimistic Recovery and other prior art techniques of transparent fault-tolerance, where logging of messages between components is required so that the non-deterministic arrival order can be replayed. It is understood that no two messages will ever have the identical VT.

When a component is chosen to execute, it may produce outputs as a result of processing the input message. The outputs are associated with VTs strictly greater than the input message's VT, reflecting the non-zero computation delay. The increment in VT, as well as the output messages, is fully determined by the input message. A component may receive inputs, for example, sent messages, or service call messages, etc. from multiple predecessor components. In this case, a deterministic merge is utilized based on VTs of the messages. VTs are generated independently by the predecessors, but they are compared locally at the merge. The message with the smallest VT can be safely processed once it is known that no predecessor can send any message in the future with an earlier VT. It is understood that, in an alternative embodiment, messages can be processed aggressively and rolled back if a message with earlier VT arrives, as in the discrete event simulation environment described in the reference to Jefferson, D. entitled "Virtual time", ACM Transactions on Programming Languages and Systems, July 1985. Because of deterministic VT generation and deterministic merging (both of which are local to the components), the order of message processing is deterministic.

Deployment Time Mechanisms

As a main difference between deterministic execution mechanisms for persistent distributed computation and other mechanisms such as transactions and entity beans, very little user intervention is required in the approach of the present invention. In particular, developers are not required to be aware of VTs or how to compute them. A set of tools is provided to dramatically simplify the application developer's work, while the benefits described herein are not compromised at all.

Placement Service

As shown in FIG. 3A, at design time, the components' computation logic may be written in plain Java, C++ or like objected-oriented code, or in other languages such as Python or Perl. Ports are defined, for example, with Java interfaces. Logical connections are created by the designers by wiring two or more ports. This high-level design completely abstracts away the distributed nature of the resulting system. It also takes such properties as deterministic execution and fault tolerance for granted. As shown in 3B, a middleware placement service component 60 is used to map this high-level design such as the design shown in FIG. 3A, onto lower-level implementation, where the most inter-related components are grouped into schedulers, and schedulers are assigned in JVMs, possibly on different machines. The placement before execution is semi-automatic, with user-supplied parameters such as metrics of machines' computation power, network capability, and placement preferences. To maximize performance, work load is balanced on different machines. At execution time, the initial placement may be fine-tuned by moving schedulers from their original machines to other machines for even better overall performance. Depending on the placement, logical connections in the developers' view may also be mapped to physical connections.

The placement service 60 simplifies the deployment task, but still provides enough flexibility by accepting user-specified configurations.

Thus, in one non-limiting example of placement, now presented for exemplary purposes, as shown in FIG. 3A, there is depicted a high-level approach of an example designer's view of a ticketing (ticket selling) system 30 that a may used to model the receipt of messages from two different requesting paths, i.e., requestors 32, 34 for reserving seats at an event, for example. These ticket requests are first received and processed to determine an amount of tickets being requested by each requestor (e.g., 5 tickets or 10 tickets) and then, finally assigned a process for printing the tickets at a printer device. The following example code portion depicts the components' logic (e.g., primitive variables, collection classes, etc.) that may be written in plain Java according to the high-level design of the example system described in FIG. 3A.

```
class Requester extends Component {
    Requester(Scheduler s, String ID) { ... }
    public RequestPort requestOut = ...
}
class TopOfN extends Component {
    TopOfN(int n, Scheduler s, String ID) { ... }
    public RequestPort requestIn = ...
    public RequestPort requestOut = ...
}
class Assigner extends Component {
    Assigner(Scheduler s, String ID) { ... }
    public RequestPort requestIn = ...
    public PrintPort assignmentOut = ...
}
class Printer extends Component {
    Printer(Scheduler s, String ID) { ... }
    public PrintPort printIn = ...
}
```

The placement service 60 will generate code for the low-level implementation as shown in FIG. 3B. In the resulting low level implementation shown in FIG. 3B, the requesters are modeled by defining ports for a first JVM 62 which receives the messages; and, further modeled are the respective ports defined at a second JVM 64 which processes the respective requests and merges the requests at an assigner component 65 that assigns the printer function component which is modeled by defining a single port for a third JVM 66 which includes a printer component 67 for performing the scheduled ticket printing process. The following example code portion depicts the placement logic that may be written in plain Java according to the lower-level design of the example system shown in FIG. 3B. This following example code depicts the configuration of the first JVM 62, which as shown in FIG. 3B is designed to include a first scheduler 72 for managing requestor components 32, 34.

```
class JVM1_Placement {
    public static void main(String[ ] args) {
        Scheduler s1 = new Scheduler(0, 1000);
        Requester r1 = new Requester(s1, "r1");
        Requester r2 = new Requester(s1, "r2");
        RequestPort t5In = (RequestPort)
            s1.createRemoteOutputPort(
                RequestPort.class,
                "localhost:1001/t5/requestIn", 0);
        s1.connect(r1.requestOut, t5In);
        RequestPort t10In = (RequestPort)
            s1.createRemoteOutputPort(
                RequestPort.class,
                "localhost:1001/t10/requestIn", 1);
        s1.connect(r2.requestOut, t10In);
        s1.start( );
    }
}
```

This following example code depicts the configuration of the second JVM 64, which as shown in FIG. 3B is designed to include a scheduler 74 for managing processing components corresponding to the requestor components 32, 34.

```
class JVM2_Placement {
    public static void main(String[ ] args) {
        Schedulers s2 = new Scheduler(2, 1001);
        TopOfN t5 = new TopOfN(5, s2, "t5");
        TopOfN t10 = new TopOfN(10, s2, "t10");
        Assigner a = new Assigner(s2, "a");
        s2.register(0, t5.requestIn);
        s2.register(1, t10.requestIn);
        s2.connect(t5.requestOut, a.requestIn);
        s2.connect(t10.requestOut, a.requestIn);
        PrintPort pIn = (PrintPort)
            s2.createRemoteOutputPort(
                PrintPort.class,
                "localhost:1002/p/printIn", 0);
        s2.connect(a.requestOut, pIn);
        s2.start( );
    }
}
```

This following example code depicts the configuration of the third JVM 66, which as shown in FIG. 3B is designed to include a scheduler 76 for managing printing processing component from a single input.

```
class JVM3_Placement {
    public static void main(String[ ] args) {
        Scheduler s3 = new Scheduler(1, 1002);
        Requester p = new Printer(s3, "p");
        s3.register(0, p.printIn);
        s3.start( );
    }
}
```

Automatic Code Enhancer

Placement service 60 also augments the user-written component to produce a component compatible with the run-time execution environment. In particular, placement service 60 supplies the following enhancements: 1) All interfaces of input and output messages or method calls are augmented with a field that holds the VT; 2) Each method that processes a message arriving at an input port is augmented with an estimator that computes the "delta-VT" for each output message it generates, and for the return from that method. The delta-VT represents a deterministic estimate of the amount of real-time that would elapse from the start of the method to either the generated output message or to the return; and, 3) Each component is augmented with code that tracks incremental changes to its state since the last soft-checkpoint, and which upon request from the scheduler, serializes an incremental soft-checkpoint record.

Soft checkpoints are so called, because any single checkpoint can be lost without compromising the system's ability to recover—a lost checkpoint merely means that recovery must proceed from the previous checkpoint, which may lengthen the time to recover after a failure, but will not affect the eventual ability to recover. Conversely, the component is augmented with code that reconstructs a state from a collection of incremental soft-checkpoint records. Optionally, a component may be augmented with code that generates "eager silences". That is, given that it is now known that no input messages are arriving on its input ports through a given time t, it computes the earliest delta-VT beyond time t for which it is possible for a message to appear on given output ports. Such a computation can be used for the purpose of sending silences to components connected to these input ports. Since a range of silent timestamps promises that no messages will ever be sent from that component with those timestamps, such information may possibly enable receiving components to proceed to process a waiting message because it is now known to be the earliest possible message.

Figure 3C:
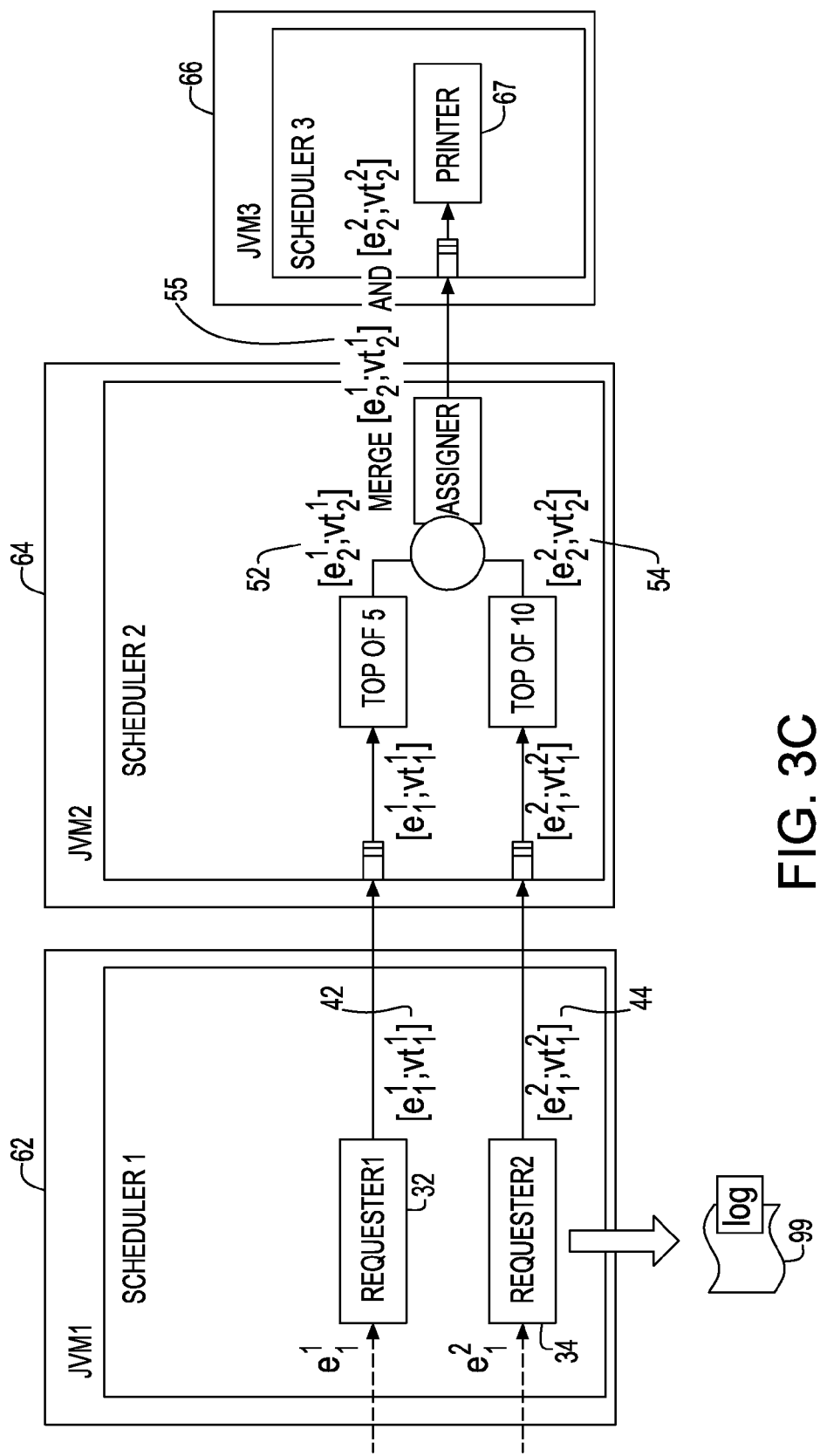

FIG. 3C depicts in more detail the determinism of VT used for augmenting the message structures required for implementing the invention as depicted by the low-level design in the example ticketing system described in the example of FIG. 3B. It is understood that messages or events ("e") are associated with VTs on the system boundary. Currently VTs are generated in an arbitrary way, consistent with causality. However, they may be an estimation of the real time. Thus, as shown in FIG. 3C, during run time, for the received message structure 42 including example associated data string ($e_1^1$) received at the first requestor component 32 of the first JVM 62 there is associated a first VT value ($vt_1^1$) that is added to the message structure 42, while the message structure 44 including example associated data string ($e_1^2$) received at the second requestor 34 is associated with a VT value ($vt_1^2$) that is added to the message structure 44. FIG. 3C additionally depicts the tracking of incremental changes to its state since the last soft-checkpoint, which upon request from the scheduler, causes generating an incremental soft-checkpoint record depicted by entry into a log 99 in a data storage device. This log 99 records all the assigned VTs, because their generation is non-deterministic, and the log will be essential when replay is required as will be described in greater detail herein below. These augmented event or request messages 42 ($e_1^1$; $vt_1^1$) and 44 ($e_1^2$; $vt_1^2$) are each input to the second JVM 64 at their scheduled VTs (virtual times) where they are processed by respective request message processing components in JVM 64. That is, as shown in FIG. 3C, after processing a received input augmented request message 42 in the second JVM 64, there is generated a further message 52 augmented to contain a computed VT value ($e_2^1$; $vt_2^1$) that is output from the first component of the second JVM 64; and, likewise, there is generated a further message 54 augmented to contain a computed VT value ($e_2^2$; $vt_2^2$) that is output from the second component of the second JVM 64. At a merge point, depicted by the assigner component 65, events from multiple streams are compared using their VTs. Thus, as shown in FIG. 3C, output from the assigner component of the second JVM is a deterministically merged message sequence 55 comprising temporally sequenced messages 52 and 54, i.e., [$e_2^1$; $vt_2^1$] and [$e_2^2$; $vt_2^2$]. The deterministic merger implemented in the third JVM 66 will then sequence operations in a deterministic order for the printing component 67 based on the merged VT values in received message 55.

Tolerance of Message Loss and Reordering

As mentioned, within a JVM, the communication between components is efficiently implemented by reference passing. Intra-JVM communication is also lossless and order-preserving. Between JVMs, UDP communication may be used even though this may cause message loss or reordering, because such loss or reordering is tolerated by the middleware component of the invention that implements concept of silence and curiosity messages that are sent between schedulers but not within schedulers.

Reducing Overhead

Figure 5:
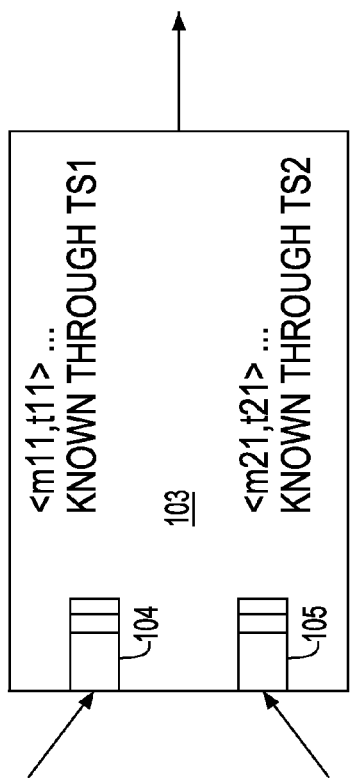
FIG. 5 depicts the queues of the fan-in component illustrated in FIG. 4.

Consider the simplest example of the overhead associated with determinism. In the embodiment shown in FIG. 4, components 101 and 102 are executing in parallel, sending messages to a receiving component 103. FIG. 5 shows more detail of how to guarantee the deterministic execution order of component 103. There are two queues, 104 and 105, queue 104 holding the messages received from component 101 and queue 105 holding the messages received from component 102. Each message on the queue, such as message <m11, t11> on queue 104, contains an original message plus a virtual time. Additionally, each queue keeps track of last time known to have either a message or known to be silent.

Figure 6:
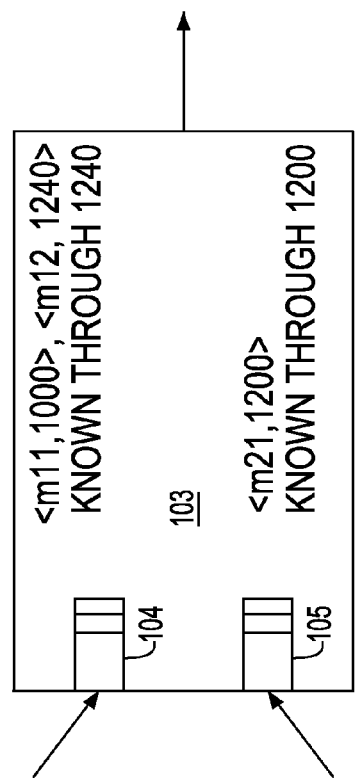
FIG. 6 illustrates an exemplary condition where the fan-in component may dequeue.

By way of example, in FIG. 6, which shows one possible condition that can arise during execution, queue 104 from component 101 contains messages at virtual times 1000 and 1240; queue 105 from component 102 contains a single message from virtual time 1200. In this situation, it is safe to process the message from component 101 at time 1000. It is known that there will not be later message arriving at earlier virtual times than 1000, since all ticks through time 1200 are accounted for on both queues.

In FIG. 7, showing a different possible condition that can arise during execution, the queue from component 101 looks as before, containing messages at virtual times 1000 and 1240, but now, the queue from component 102 only shows knowledge of ticks through time 900. Now, it is no longer safe to process the message from component 101, since it is possible that component 102 or its physical link is slow, and a message at a virtual time such as 950, earlier than 1000, might arrive in the future. This is a situation where forcing determinism incurs a real-time overhead relative to a non-deterministic system that would process messages in first-come first-served order irrespective of any virtual time tag.

In a naïve implementation, the receiving component 103 would have to wait until the next message arrived from component 102. Improvement on this technique would be based upon proactively obtaining information from component 102 about ticks of virtual time guaranteed to be silent.

Three embodiments to trace when virtual time is guaranteed to be silent are discussed here. However, those skilled in the art would recognize other embodiments are possible.

Curiosity-driven silence: In this embodiment, when component 103 would otherwise be ready to process a message (as in the case of FIG. 7, the message at virtual time 1000 from component 101), it will send a curiosity message towards components, such as 102 in this example, regarding its status for ticks earlier than 1000 is unknown. In previous work on fault-tolerance, curiosity was used to detect possibly lost messages, but in this invention, the curiosity message is sent in response to a requirement to dequeue a message, by prompting other senders to send more accurate information about time ranges known to be silent. Upon receiving the curiosity message, the estimator in component 102 will re-examine its state, and compute a number one tick less than the earliest tick in which it could possibly send its next message. For example, it may have received a message at time 920, and it knows that the shortest possible path length for processing any message is 181 ticks. Therefore, component 102 can compute that no future message will have a virtual time of less than 1101, and therefore it can promise "silence" through tick 1100. Component 102 replies to the curiosity message by promising silence through tick 1100, and component 103 can now update its state of known ticks for queue 105 to a state of "known through 1100", as seen in FIG. 8. In this state, it is now safe for component 103 to dequeue and process its message from queue 104 at virtual time 1000.

Time-driven silence: This second embodiment is even more aggressive than the embodiment discussed above, in that component 102 can periodically send silence information without waiting for a prompt from a receiving component. Let us suppose that component 102 is driven by messages from the external world. External messages are logged, and receive virtual timestamps from a clock. Now suppose that component 102 has been idle for more than a particular threshold of real time. In this case, component 102 receives a notification from a timer that this threshold has expires, it reads the clock—this value represents a number t guaranteed to be smaller than the time of the next message it will process—and then as above, executes its estimator program to compute the next silence range by computing t plus the number of ticks in the shortest possible path that would be executed by a future data message. Time-driven silence has the advantage over curiosity that it avoids the need for a round-trip delay over a link, and a possible cascade of delays if the sender is itself idle and needs to invoke curiosity to determine the time of its earliest next message. It has the potential disadvantage of generating extra periodic message traffic just to communicate the absence of messages.

Hyper-aggressive silence: The third embodiment is applicable in the case where the relative rates of the sending components 101 and 102 have been measured and can be modeled approximately as a known process, e.g. a Poisson process. A description of Poisson processes appears in M. K. Aguilera and R. E. Strom entitled "Efficient atomic broadcast using deterministic merge", Proc. 19th Annual ACM Intl. Symp. on Principles of Distributed Computing (PODC-19), Portland, Oreg., USA, 209-218, 2000. Suppose, for instance, that components 101 and 102 have been measured over some recent past time to have average message rates of $\lambda_1$ and $\lambda_2$ respectively. Suppose that component 101 would have sent a message at time 1000. Rather than simply sending the message at time 1000, it will send additional silences. The silences would encompass not only the time that the next possible message would have taken to process, but also an additional bias reflecting an attempt to minimize the delay cost knowing that these messages are being merged with a process with a known average message rate. The faster process will send fewer additional silence ticks; the slower process more. The exact amount of extra silence is based upon a control theory optimization as described in the above-identified reference (PODC-19); the amount of silence is set to minimize the expected value of delay in the receiving component 103 assuming the given message rates. When this protocol is used, the estimator must record the amount of extra silence ticks promised and, once having promised silence through a particular tick of virtual time, must make sure that its next message is given a virtual time at least one tick after that virtual time (even if the estimator would normally have generated an earlier virtual time).

Figure 9:
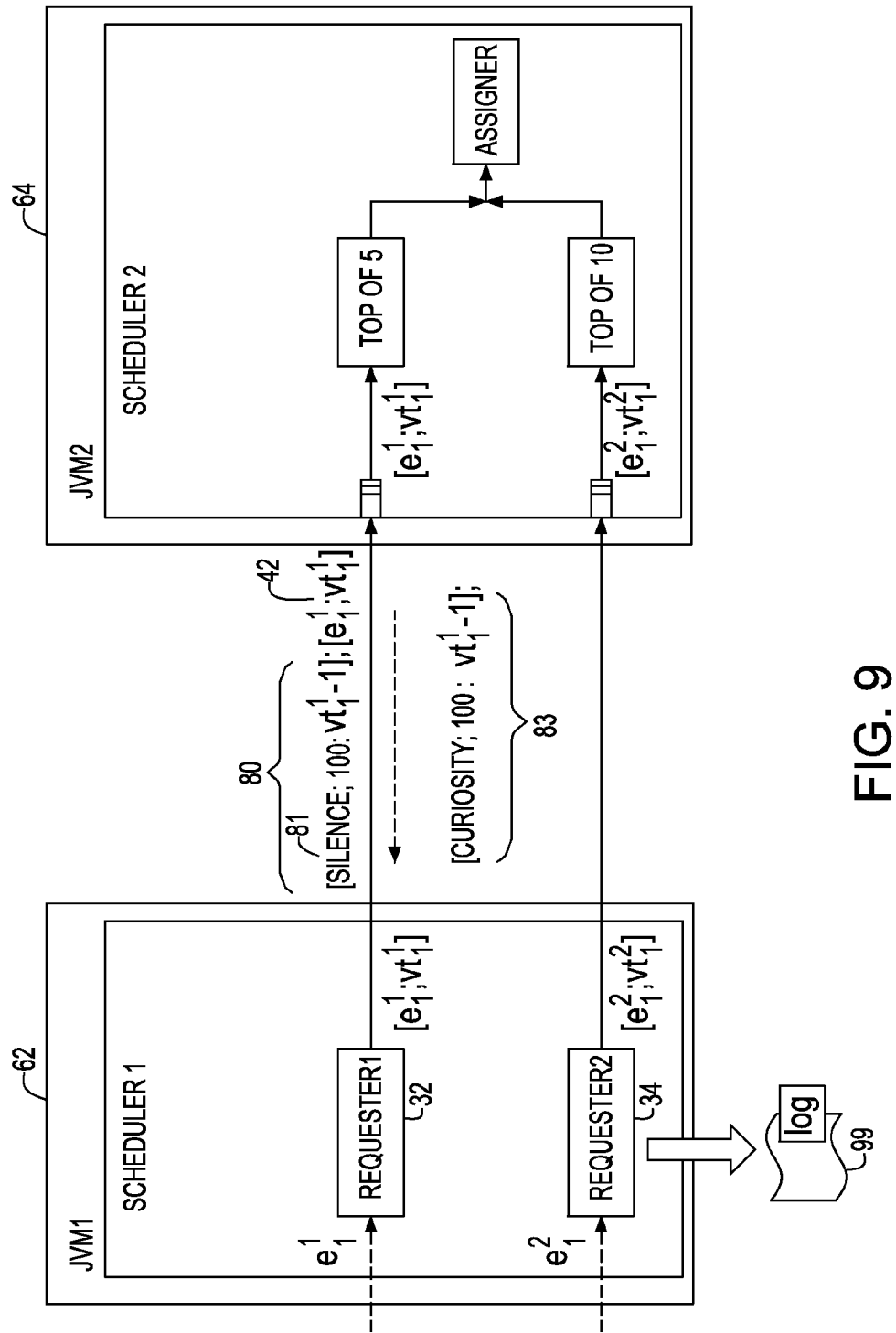
FIG. 9 depict an example application enabled by the server middleware components of the present invention including silence and curiosity message generation.

Continuing to FIG. 9, there is shown the incorporation of silence and curiosity messages to ensure detection of missing messages in the inventive system. As shown in FIG. 3D, it is assumed that a time gap exists in VT, that is, unless the two messages are exactly next to each other in the time line. The existence of the time gap is detected by the server's middleware component, e.g., scheduler. For example, after the first JVM 62 sends the first augmented message 42, and prior to sending the second augmented message, the JVM 62 generates and sends one or more silences, i.e., silence message 81, to fill the gap so that the receiver, e.g., JVM 64, gets continuous knowledge of either messages or silences. A silence message defines a pair of numbers designating a range of time ticks of VT that are known not to contain messages. For example, the message 80 in FIG. 3D sent just before the message 42 may contain the data [Silence; 100: $vt_1^1-1$], meaning that all ticks of VT in the range from 100 to $vt_1^1-1$ are known not to contain messages. Because of silence messages, receivers can account for every tick as either definitely containing a message or a silence. If a data or silence message is lost, the receiver will notice a gap. Gap detection is performed on the receiver side. If a gap exists for a certain period (defined as a user-configurable or programmable parameter), the receiver, e.g., JVM 64 may decide that some messages or silences have been lost, and then issue a curiosity message 83 for receipt back to the sender, e.g., JVM 62.

If curiosity messages are lost, or the resent messages are lost, the curiosity messages will be resent. As long as the same message is not infinitely often lost, eventually, lost messages will be retrieved. It should be understood that, a message may arrive late, and may duplicate a resent message, but this does not cause any problems since it is safe for a receiver to discard any message whose VT matches a time for a message it has already processed; i.e., no two messages will ever have the identical VT. Reordering is also tolerated because the receiver simply refuses to process a message if there is still a gap before it. Thus, as shown in FIG. 9, queuing, silence and curiosity altogether guarantee message processing in the correct order.

Virtual Time Estimator

So far, the VT generation is allowed to be arbitrary provided that it is fully deterministic and it preserves the message causality. Any such VT assignment guarantees deterministic execution. However, if VTs are too far out-of-sync with real time, then a performance penalty is seen, because at a merge, the receiver would refuse to process the next message until it is sure that it will not receive any message earlier in VT. This may cause the messages generated earlier in real time to be processed later because they acquire larger VTs due to inaccuracy of the estimation. An automatic VT estimator is provided to attempt to maintain VTs and real time in approximate synchronization so that this pessimism does not cause unacceptable performance loss. There is both a static (i.e., pre-execution) and a dynamic (i.e., during execution) component to this VT estimation. Statically, the automatic VT estimator estimates the computation delay on individual components, based on the known complexity of the code. At deployment time, the estimator may also take into account known properties of the environment on which the component was deployed. This will adjust the computation delay estimate to reflect things such as network latency, average CPU load, garbage collector performance, expected memory consumption, threading, etc. However, the computation delay estimate must be a deterministic, repeatable function of the component state. It may not take into account non-deterministic factors, such as the actual current CPU load. If a scheduler notices that the disparity between VT and real time becomes too large, it can take one of two possible actions:

1. The scheduler may change its priority relative to other schedulers in the machine so that it slows down or speeds up, and reduces the disparity.

2. The scheduler may make a non-deterministic decision—a so-called "determinism fault"—to adjust the parameters to the estimators used within the scheduler. This adjustment, being non-deterministic, is allowed, unlike the normal computation delay estimate, to take into account non-deterministic factors. Because such a decision violates determinism, this action must be logged in stable storage in order to guarantee proper replay. In effect, any replay of VTs prior to the decision must use the old estimator, and any replay of VTs subsequent to the decision must use the new estimator. A determinism fault may result in the change to particular time estimates for particular messages. The goal of the system is to make the static estimators good enough so that drift between VT and real time is minimized and can be controlled by adjusting scheduling priorities, so that determinism faults are extremely rare events.

As was mentioned earlier, a VT estimator may only observe variables that would not change on re-execution, such as how many times this loop was executed or how often the then clause of this conditional expression was executed. It may not measure stochastic variables such as the communications load. However, it may measure deterministic variables that may correlate with such stochastic variables. In the case of communication delay, consider again FIG. 4 and suppose that components 102 and 103 communicate over a physical link. The link delay is a stochastic variable. However, the number of messages sent in the last K ticks of virtual time through component 102 is a deterministic variable that may correlate well with the communication delay. So in this protocol, the virtual time of the message sent from component 102 to 103 will be augmented by a number set to be a given function of the message rate during the recent past virtual history. The function will be periodically calibrated as discussed below for all VT estimators.

Calibrating the Virtual Time Estimator

Figure 4:
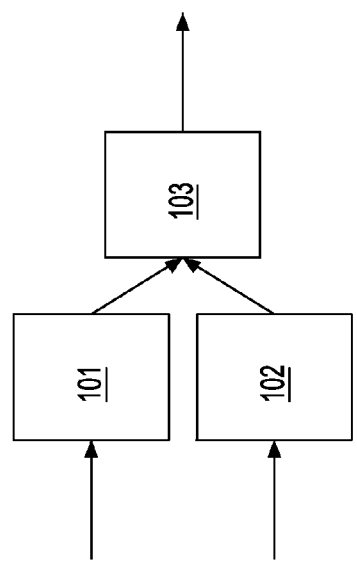
FIG. 4 depicts an embodiment of the present invention where multiple components communicate with a single, fan-in component.

Suppose a component 102, illustrated in FIG. 4, executes three basic blocks—a loop, and two conditional expressions. It also incurs a communication delay estimated (see above) as being a function of the estimated queue size (number of messages enqueued per virtual time unit less average number of messages transmitted per virtual time unit). So each time component 102 executes, it saves four variables: the 3 basic block counts and the queue size estimate. Let these variables be called $v_1 \ldots v_4$, and the total delay will be a linear function $$\sum_{i=1}^{4} r_i v_i.$$

Periodically, at the end of each new "epoch", samples will be taken of the values of $v_i$ and of delay, and regression analysis will be performed to compute the best estimate of the $r_i$ that will be used for the next epoch. This will require the system to log the time of the new epoch, and the values of these $r_i$ since they will not be deterministic.

Supporting Time Awareness

Some application components will need to be time aware, and the interfaces of this runtime have been extended to support them.

In the simplest case, some applications will need to "read the system clock". That is a non-deterministic operation, and reading the system clock with reading the "virtual time" as computed by the estimator. This is a number that (assuming the rest of the system has been properly calibrated to minimize disparity between real and virtual time) will be close to real time. At other times, it is necessary for a receiving component to act within a fixed time period. It will use an exact data computed by a sending component if that value is available, otherwise it will use an alternative value computed as a default, if that value is not available within the time deadline. The approach taken in this invention is called "provisional messages".

Figure 10:
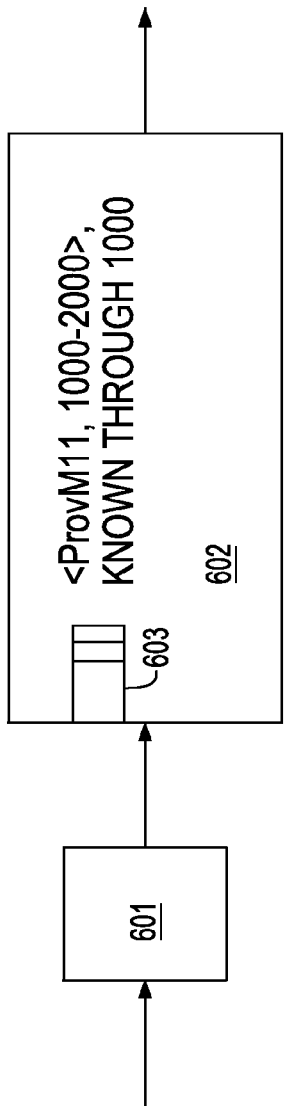
FIG. 10 depicts an embodiment of the present invention which uses a provisional message.

In FIG. 10, sending component 601 has determined it cannot compute an accurate delta-VT to attach to the message sent to component 602 by time 2000. Consequently, the provisional message <ProvM11> is to be used instead, to allow action by the receiving component within the fixed time period. Sending component 601 does this by delivering the provisional message any time in advance of time 2000. It includes a time range, in this case 1000 through 2000, which is the interval during which the provisional message may be superseded by a non-provisional message.

Figure 11:
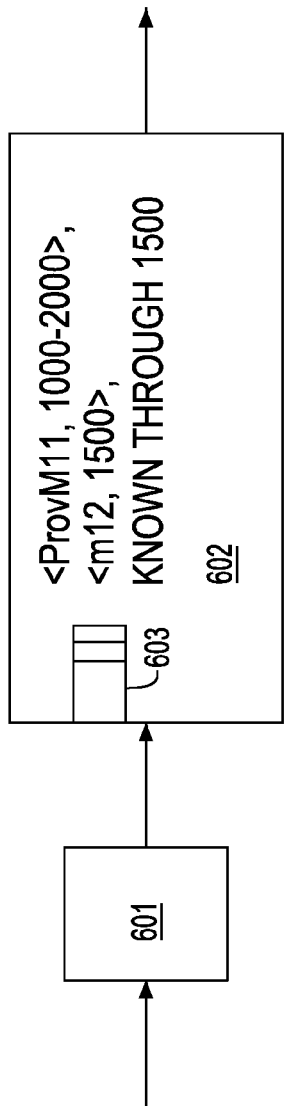
FIG. 11 illustrates an exemplary condition where the provisional message is superseded by another message.

FIG. 11 illustrates the "normal" case, in which component 601 is able to perform its processing and deliver a proper message within the specified time. In this example, component 601 delivers a message <m12>, which arrives at component 602 at the virtual time 1500. When this happens, component 602 discards the provisional message, substitutes the superseding message <m12>, which is then scheduled for execution in the usual way.

Figure 12:
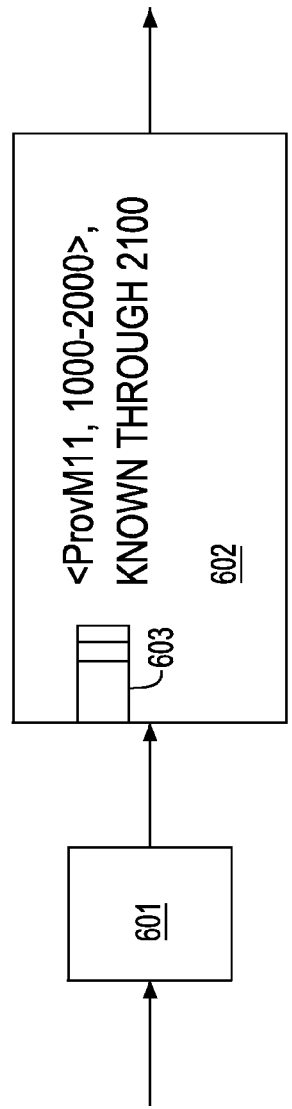
FIG. 12 illustrates an exemplary condition where the provisional message becomes final.

FIG. 12 illustrates the "abnormal" case. There are two ways in which the abnormal case can happen. The simplest of these situations is one in which the estimator for component 601 calculates that because no input message has arrived in time, it will not be possible to deliver a message in time. Using any of the silence propagation techniques discussed herein, it delivers a silence message, for instance, saying that the next message can arrive no earlier than time 2100. When component 602 receives this silence message, it knows that no superseding message can possibly arrive, and it immediately promotes the provision message <ProvM11> to a "final" message, and schedules it for delivery at virtual time 2000. This takes care of the case where no superseding message will arrive because no timely computation has taken place in the sending component 601. There is also a "failure mode" case, where due to abnormal conditions such as a broken physical link between the machines hosting components 601 and 602, a message may be sent, but nothing, neither message nor silence, is received by a real time within a reasonable threshold of virtual time 2000. Additionally, a new kind of determinism fault may arise: if it appears that due to an unusual condition, a real-time deadline will not be met for a given computation, a non-deterministic decision to use an alternative computation (with presumably less overhead) may be taken. As with any determinism fault, the decision to make such a change is logged. In that case, a "determinism fault" is taken, a silence for times through 2000 is delivered to component 602, the fact of this silence is logged, and any message with time earlier than 2000 that may arrive subsequently is discarded, because it has been superseded by this generated silence. The provisional message previously sent is now promoted to "final" and is scheduled for delivery.

Tolerance of Machine Failure with High Availability

In a distributed system, machines may be shut down or disconnected from the network unexpectedly, or may fail. Many contemporary applications take advantage of the collaboration among machines. The use of multiple machines enables high availability. With this property, the failure of some machines does not interfere with the application's overall functionality. In the execution server of the present invention, fault tolerance is transparent. The middleware component intermittently creates soft checkpoints for individual schedulers. A soft checkpoint is a compact image of the scheduler's state, including the components in it, the established connections, the queued messages, waiting service calls, etc. Soft checkpoints may either contain full state, or may contain incremental changes since the previous soft checkpoint. The state of user-defined components (including, for example, language-level entities such as Java primitive values and objects with cross references) is also recorded in the checkpoint, so that when the machine fails and recovers, the computation can be resumed.

Figure 13:
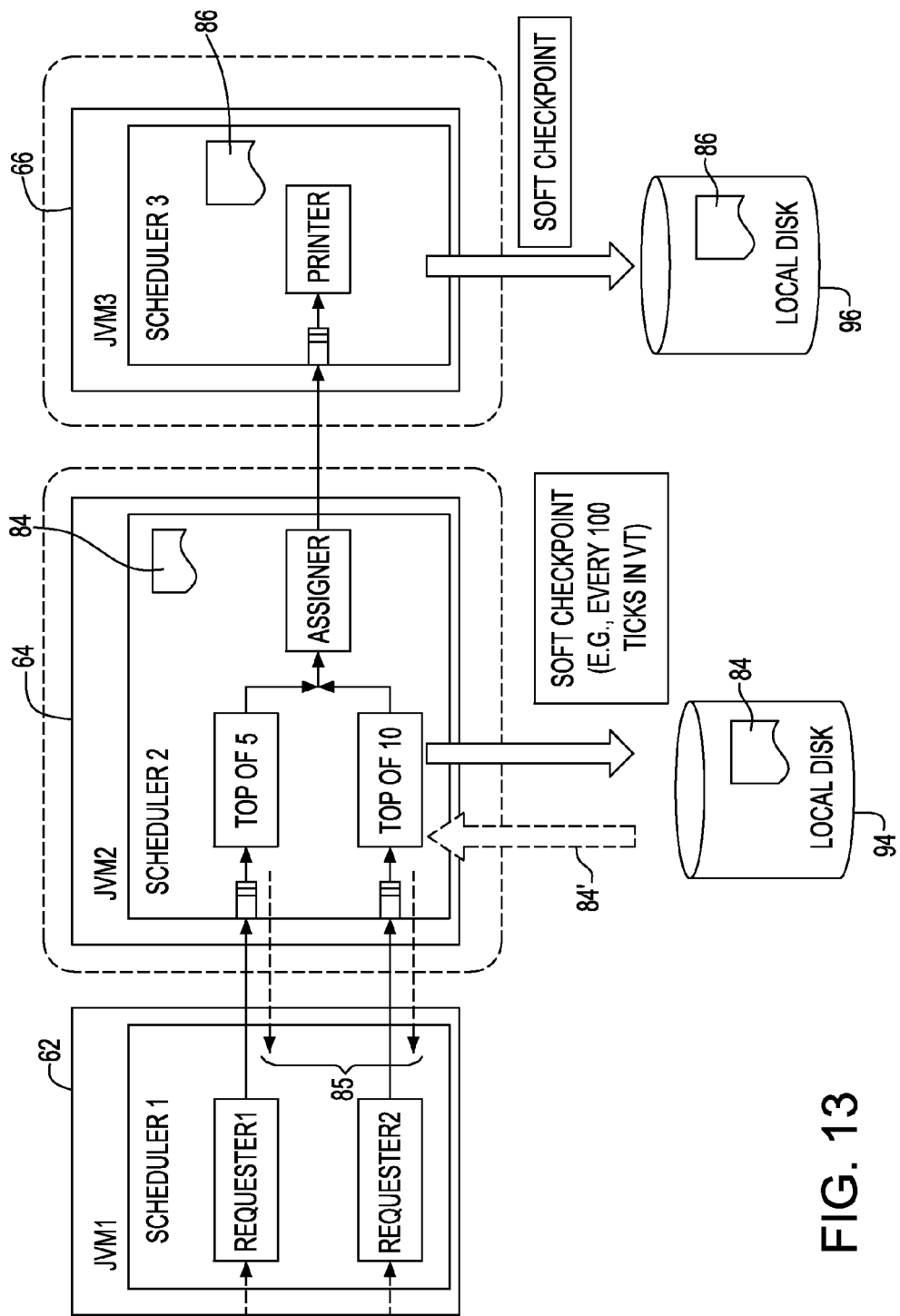
FIG. 13 demonstrates an overview of checkpointing to a storage device and checkpoint recovering from a storage device according to the principles of the invention.

Thus, as shown in FIG. 13, checkpoint information 84, 86 for each of the schedulers in JVM's 64, 66 are stored and intermittently or incrementally updated on a local memory storage device, e.g., hard disk drive 94, 96, respectively. However, it is understood that these checkpoints may be stored at or on remote machines.

During execution, a JVM machine may crash, and due to this event, the schedulers running on it stop and completely lose their state since their last checkpoints. When the machine restarts, it recreates the schedulers with their last checkpoints.

Thus, as shown in FIG. 13, assuming a crash event at JVM 64, stored checkpoint information 84' for the example scheduler in JVM 64 will be communicated from the local memory storage device, e.g., hard disk drive 94, back to the restarted scheduler component executing at JVM 64. These checkpoints are in the schedulers' past because some messages may have been received and even processed after the checkpoints were taken. The schedulers will thus independently send curiosity messages 85 to their predecessors, causing the predecessors to resend the missing messages. According to the invention, the missing messages will then be reprocessed, and due to the deterministic execution afforded by the present invention, the same results will be generated. When a scheduler catches up with the time at which it failed, its state becomes identical to its state right before it failed. From then on, it continues to process new messages.

As mentioned, checkpoint information for each of the schedulers in JVM's may be stored and intermittently or incrementally on a remote machine (e.g., JVM). Thus, in an alternate embodiment, a remotely located scheduler may perform a "passive backup" by storing checkpoints from another scheduler. If passive backups are used to store the checkpoints, then when a failure is detected, the passive backup creates instances of the backed up components, i.e., spawns a replica, and becomes active, resuming the failing scheduler's work until it restarts and catches up with the missing computation. Passive backups, unlike active replicas of some other fault-tolerant systems, do not perform redundant computations. They merely hold checkpointed state, so that if the active machine fails, the backup is able to rapidly take over the computation with minimal delay.

Figure 14A:
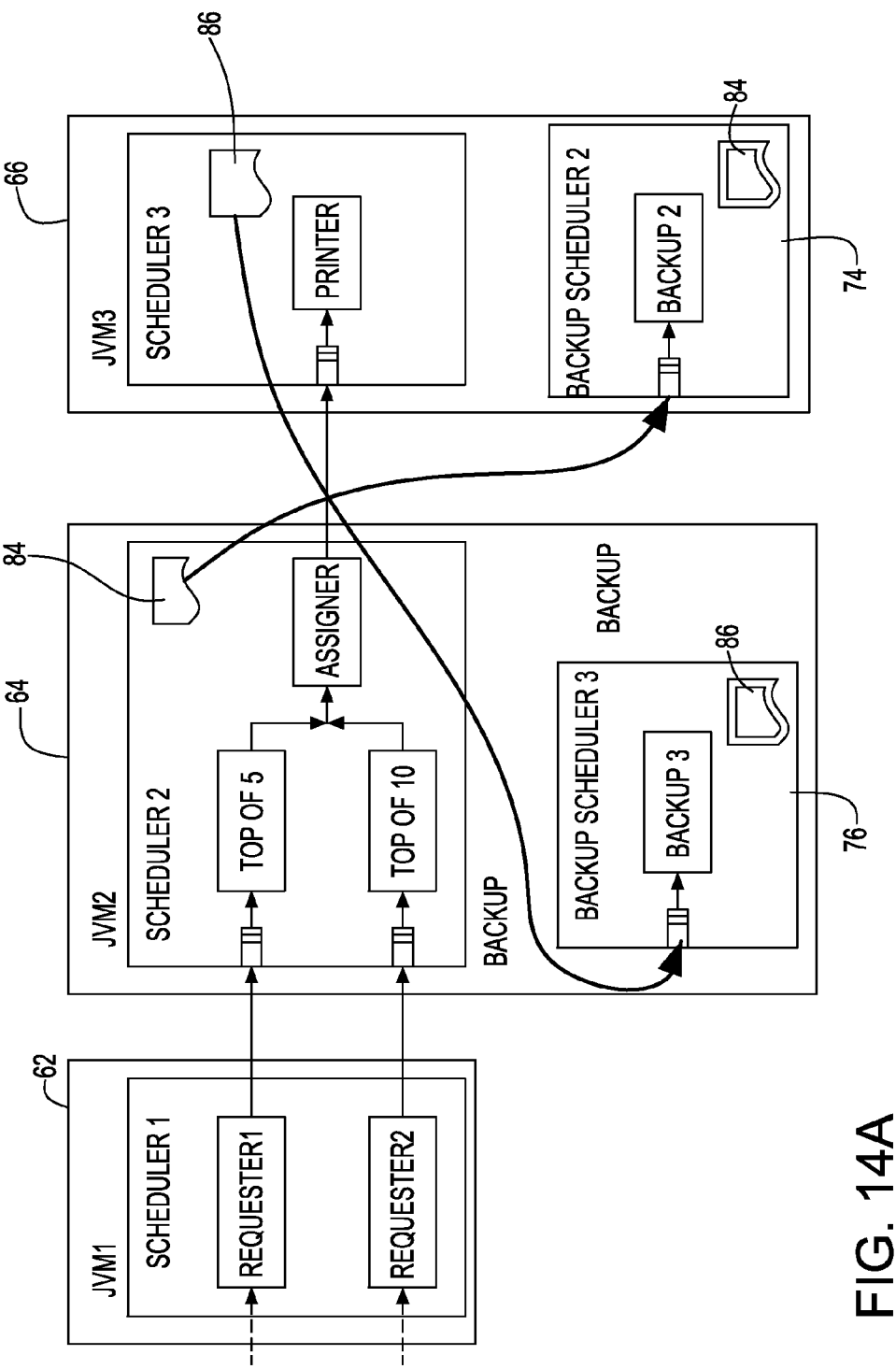
FIGS. 14A-14C demonstrates an overview of using passive remote backups and spawning scheduler replicas for providing the high availability afforded by the present invention.
Figure 14B:
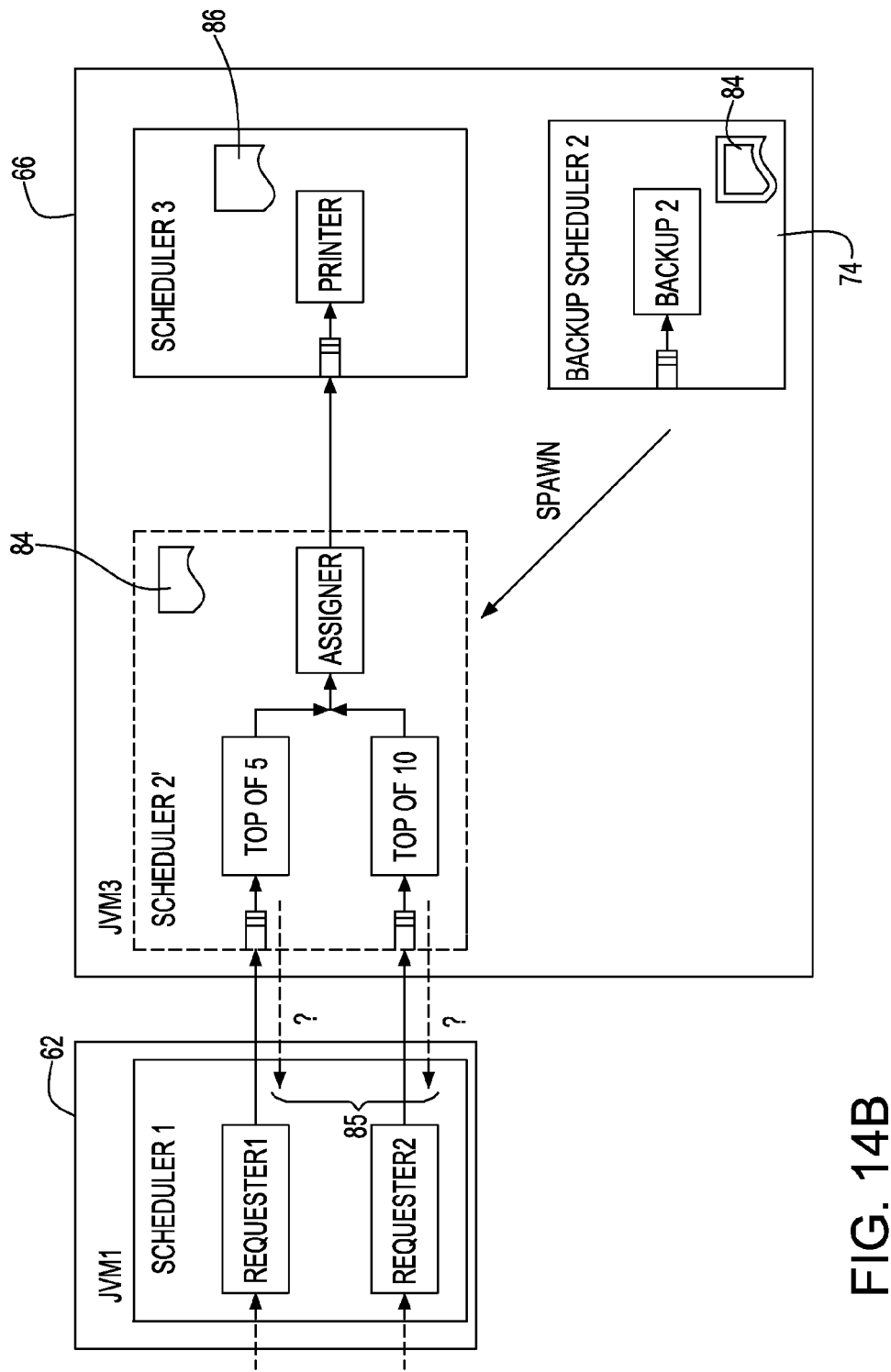

Thus, as shown in FIG. 14A, soft checkpoint information 84 for the example scheduler in JVM 64 will be communicated to a memory associated with a back-up scheduler component 74 for the second JVM 64 that is remotely stored in the third JVM 66 for storage thereat; likewise, as shown in FIG. 14A, soft checkpoint information 86 for the example third scheduler in JVM 66 will be communicated to a memory associated with a back-up scheduler component 76 for the third JVM 66 that is remotely stored in the second JVM 64 for storage thereat. Thus, for example, when JVM 64 that includes scheduler2 and back-up scheduler component 76 becomes disabled or otherwise crashes, a replica of the scheduler2 that was executing in JVM 64 may be generated as shown in FIG. 14B. That is, in JVM 66, a replica of the scheduler2 that was executing in JVM 64 may be spawned based on the remote passive back-ups. That is, a new scheduler scheduler2' is spawned that includes the components of the second JVM 64 for execution. Based on a maximum failure detection delay and the time for replica creation, the maximum downtime can be estimated in case of one failure which provides high availability assurance.

Figure 14C:
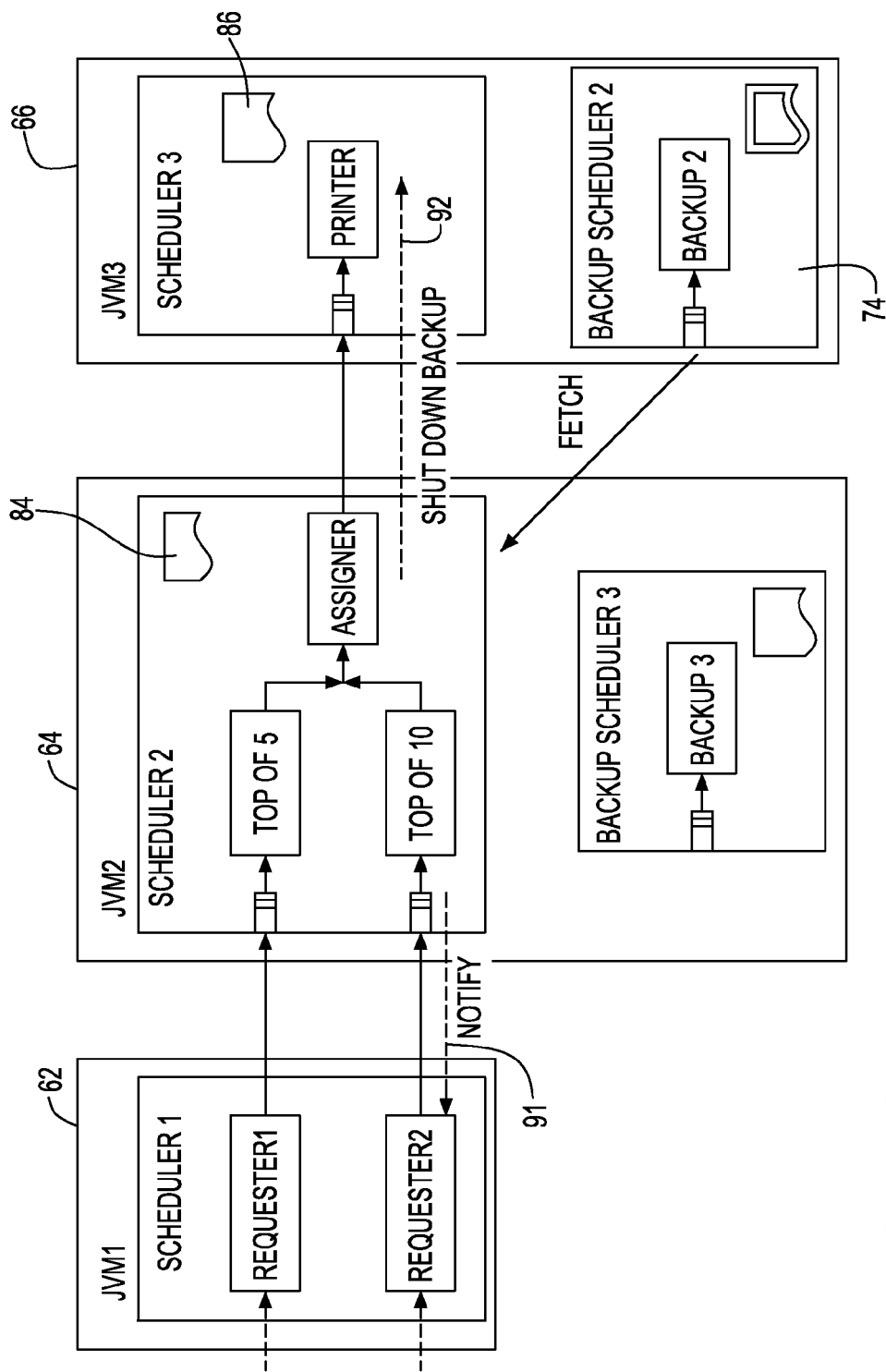

Finally, shown in FIG. 14C, upon recovery of the crashed second JVM 64, the revived scheduler2 will fetch the checkpointing information that had been stored at the spawned replica, i.e., scheduler2', in the third JVM 66. Consequently, it may be indicated to predecessor components on other machines (e.g., JVM1) that the second JVM 64 is up and running via a notify message 91; and, further, indicated to the third JVM 66 that the spawned remote back-up of the scheduler2 (i.e., scheduler2') may be terminated.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A deterministic computing system, comprising:
a memory storage device;
at least one computing device coupled to said memory storage device and running instructions to perform a method and to communicate data messages amongst operating components, wherein a component is a sending component when sending a data message and a promised silence message, and is a receiving component when receiving the data message and the promised silence message; said method comprising:
recording a virtual time ("VT") by the component to start computation of the data message by the component;
computing a delta-VT for the data message, where the delta-VT is a numeric value calculated to include an approximate execution time for the data message and an approximate communications delay for sending the data message;
computing a data timestamp associated with the data message when sent by the sending component to the receiving component, where the data timestamp is calculated by increasing the virtual time with the delta-VT;
computing a promised silence range by the sending component, where the promised silence message indicates a range of virtual time values that the sending component will avoid sending data messages;
communicating the promised silence message including said promised silence range from the sending component to other components;
executing the data message by using the data timestamps to generate a unique arrival order of data messages;
wherein a sending component sends to a receiving component a provisional message having fallback data and a deadline, such that if said data message is not superseded before the deadline, the provisional message will be delivered to the receiver;
exploiting the promised silence range by the receiving component to determine when to process data messages in said unique arrival order;
tracking state of a component during program execution; and
storing said state to a local storage device or backup machine.

2. The deterministic computing system as claimed in claim 1, wherein for exploiting the promised silence range by the receiving component, said at least one computing device is configured to:
detect a candidate message, where the candidate message is scheduled to be processed next in said unique arrival order unless a set of sending components have messages with timestamps proceeding the timestamp for the candidate message;
send a curiosity message to the set of sending components;
receive, in response to the curiosity message, a set of promised silence messages from components in the set of sending components; and
determine, in response to the received set of promised silence messages, whether to process the candidate message,
wherein for computing the promised silence range by the sending component, said at least one computing device is configured to:

receiving receive the curiosity message from a receiving component, compute the earliest possible virtual time that the next data message destined for said receiving component will arrive, in response to said curiosity message, and generate and communicate a promised silence message to the receiving component that sent the curiosity message.

3. The deterministic computing system as claimed in claim 1, wherein for computing said promised silence range by the sending component, said at least one computing device is configured to:

intermittently and proactively at periodic intervals, compute the earliest possible virtual time that the next data message destined for each receiving component will arrive; and generate and communicate the promised silence message including said promised silence range to each receiving component.

4. The deterministic computing system as claimed in claim 1, wherein the approximated communications delay for sending data the data message includes a deterministic estimate of communications delay based upon a link congestion factor, where computing the link congestion factor includes a record of recently sent messages from the sender component to the receiver component.

5. The deterministic computing system as claimed in claim 1, wherein for computing the delta-VT, said at least one computing device is configured to:

record, as samples, iterations of a basic block of a component computation during executed; and use a linear regression method to calibrate the coefficients of a linear estimator function to provide an optimal fit to the samples, where the linear estimator function is predetermined and models the iterations of a basic block of computation within the component.

6. The deterministic computing system as claimed in claim 1, wherein for computing said promised silence range by the sending component, said at least one computing device is configured to analyze the shortest path that a hypothetical next computation could take before sending a message to a given receiving component.

7. The deterministic computing system as claimed in claim 6, wherein for computing said promised silence range, said at least one computing device is configured to compute an additional promised silence range according to a sent message model that includes message rates from said sending component relative to other components sending to the receiving component.

8. The deterministic computing system as claimed in claim 1, wherein said at least one computing device is further configured to:

monitor disparity between real and virtual time of messages from sending components; and adjust the scheduling priority of components by increasing amounts of execution time for sending components whose sent data messages are consistently received later than virtual timestamp, and likewise decreasing amounts of execution time for sending components whose sent messages are consistently received earlier than their virtual timestamp.

9. The deterministic computing system as claimed in claim 1, wherein said at least one computing device is further configured to:

record said deadline of said provisional message, when the receiving component holds the fallback data;

discard the provisional message when a conditional on a superseding message arrives before the recorded deadline;

deliver the provisional message to the receiving component when a conditional on a promised silence message subsumes all ticks through the deadline.

10. A method for deterministic execution of components in a computing system providing an execution environment adapted for enabling message communication amongst and between said components, each said component implementing logic to perform a task and each component is a sending component when sending a data message and a promised silence message and is a receiving component when receiving the data message and the promised silence message, said method comprising:

recording virtual time ("VT") by the component to start computation of the data message by the component;

computing a delta-VT for the data message, where the delta-VT is a numeric value calculated to include an approximate execution time for the data message and an approximate communications delay for sending the data message;

computing a data timestamp associated with the data message when sent by the sending component to the receiving component, where the data timestamp is calculated by increasing the virtual time with the delta-VT;

computing a promised silence range by the sending component, where the promised silence message indicates a range of virtual time values that the sending component will avoid sending data messages;

communicating the promised silence message including said promised silence range from the sending component to the other components;

executing the data message by using the data timestamps to generate a unique arrival order of data messages;

wherein a sending component sends to a receiving component a provisional message having fallback data and a deadline, such that if said data message is not superseded before the deadline, the provisional message will be delivered to the receiver;

exploiting the promised silence range by the receiving component to determine when to process data messages in said unique arrival order;

tracking state of a component during program execution; and storing said state to a local storage device or backup machine.

11. The method as claimed in claim 10, wherein said exploiting the promised silence range by the receiving component includes:

detecting a candidate message, where the candidate message is scheduled to be processed next in said unique arrival order unless a set of sending components have messages with timestamps proceeding the timestamp for the candidate message;

sending a curiosity message to the set of sending components;

receiving, in response to the curiosity message, a set of promised silence messages from silence sending components in the set of silence sending components;

determining, in response to the received set of promised silence messages, whether to process the candidate message, and wherein said computing the promised silence range by the sending component includes the steps of:

receiving the curiosity message from a receiving component, computing the earliest possible virtual time that the next data message destined for said receiving component will arrive, in response to said curiosity message, and generating and communicating a promised silence message to the receiving component that sent the curiosity message.

12. The method as claimed in claim 11, wherein said computing the promised silence range by the sending component includes:
   intermittently and proactively at periodic intervals, computing the earliest possible virtual time that the next data message destined for each receiving component will arrive; and
   generating and communicating a promised silence message including said promised silence range to each receiving component.

13. The method as claimed in claim 10, wherein the approximated communications delay for sending data the data message includes a deterministic estimate of communications delay based upon a link congestion factor, where computing the link congestion factor includes a record of recently sent messages from the sender component to the receiver component.

14. The method as claimed in claim 10, wherein said computing the delta-VT includes:
   recording, as samples, iterations of a basic block of a component computation during executed; and
   using a linear regression method to calibrate the coefficients of a linear estimator function to provide an optimal fit to the samples, where the linear estimator function is predetermined and models the iterations of a basic block of computation within the component.

15. The method as claimed in claim 10, wherein said computing said promised silence range by the sending component includes analyzing the shortest path that a hypothetical next computation could take before sending a message to a given receiving component.

16. The method as claimed in claim 15, wherein said computing said promised silence range further includes computing an additional promised silence range according to a sent message model that includes message rates from said sending component relative to other components sending to the receiving component.

17. The method as claimed in claim 10, wherein said method further includes:
   monitoring disparity between real and virtual time of messages from sending components; and
   adjusting the scheduling priority of components by increasing amounts of execution time for sending components whose sent data messages are consistently received later than virtual timestamp, and likewise decreasing amounts of execution time for sending components whose sent messages are consistently received earlier than their virtual timestamp.

18. The method as claimed in claim 10, further comprising:
   recording said deadline of said provisional message, when the receiving component holds the fallback data;
   discarding the provisional message when a conditional on a superseding message arrives before the recorded deadline;
   delivering the provisional message to the receiving component when a conditional on a promised silence message subsumes all ticks through the deadline.

19. A program storage device readable by a machine, tangibly embodying a program of instructions executable by the machine to perform a method for deterministic execution of components in a computing system providing an execution environment adapted for enabling message communication amongst and between said components, each said component implementing logic to perform a task and each component is a sending component when sending a data message and a promised silence message and is a receiving component when receiving the data message and a promised silence message, said method steps comprising:
   recording virtual time ("VT") by the component to start computation of the data message by the component;
   computing a delta-VT for the data message, where the delta-VT is a numeric value calculated to include an approximate execution time for the data message and an approximate communications delay for sending the data message;
   computing a data timestamp associated with the data message when sent by the sending component to the receiving component, where the data timestamp is calculated by increasing the virtual time with the delta-VT;
   computing a promised silence range by the sending component, where the promised silence message indicates a range of virtual time values that the sending component will avoid sending data messages;
   communicating the promised silence message including said promised silence range from the sending component to the other components;
   executing the data message by using the data timestamps to generate a unique arrival order of data messages;
   wherein a sending component sends to a receiving component a provisional message having fallback data and a deadline, such that if said data message is not superseded before the deadline, the provisional message will be delivered to the receiver;
   exploiting the promised silence range by the receiving component to determine when to process data messages in said unique arrival order;
   tracking state of a component during program execution; and
   storing said state to a local storage device or backup machine.

20. The program storage device as claimed in claim 19, wherein said exploiting the promised silence range by the receiving component includes:
   detecting a candidate message, where the candidate message is scheduled to be processed next in said unique arrival order unless a set of sending components have messages with timestamps proceeding the timestamp for the candidate message;
   sending a curiosity message to the set of sending components;
   receiving, in response to the curiosity message, a set of promised silence messages from silence sending components in the set of silence sending components;
   determining, in response to the received set of promised silence messages, whether to process the candidate message, and
   wherein said computing the promised silence range by the sending component includes the steps of:
      receiving the curiosity message from a receiving component,
      computing the earliest possible virtual time that the next data message destined for said receiving component will arrive, in response to said curiosity message, and
      generating and communicating a promised silence message to the receiving component that sent the curiosity message.

21. The program storage device as claimed in claim 19, wherein said computing said promised silence range by the sending component includes:

intermittently and proactively at periodic intervals, computing the earliest possible virtual time that the next data message destined for each receiving component will arrive; and generating and communicating a promised silence message including said promised silence range to each receiving component.

22. The program storage device as claimed in claim 19, wherein the approximated communications delay for sending data the data message includes a deterministic estimate of communications delay based upon a link congestion factor, where computing the link congestion factor includes a record of recently sent messages from the sender component to the receiver component.

23. The program storage device as claimed in claim 19, wherein said computing the delta-VT includes:

recording, as samples, iterations of a basic block of a component computation during executed; and using a linear regression method to calibrate the coefficients of a linear estimator function to provide an optimal fit to the samples, where the linear estimator function is predetermined and models the iterations of a basic block of computation within the component.

24. The program storage device as claimed in claim 19, wherein said method further includes:

monitoring disparity between real and virtual time of messages from sending components; and adjusting the scheduling priority of components by increasing amounts of execution time for sending components whose sent data messages are consistently received later than virtual timestamp, and likewise decreasing amounts of execution time for sending components whose sent messages are consistently received earlier than their virtual timestamp.

25. The program storage device as claimed in claim 19, further comprising:

recording said deadline of said provisional message, when the receiving component holds the fallback data;

discarding the provisional message when a conditional on a superseding message arrives before the recorded deadline;

delivering the provisional message to the receiving component when a conditional on a promised silence message subsumes all ticks through the deadline.

\* \* \* \* \*